A. WALDER.
FLUID TIGHT ROTARY JOINT FOR PIPES.
APPLICATION FILED FEB. 23, 1909.
929,734.
Patented Aug. 3, 1909.
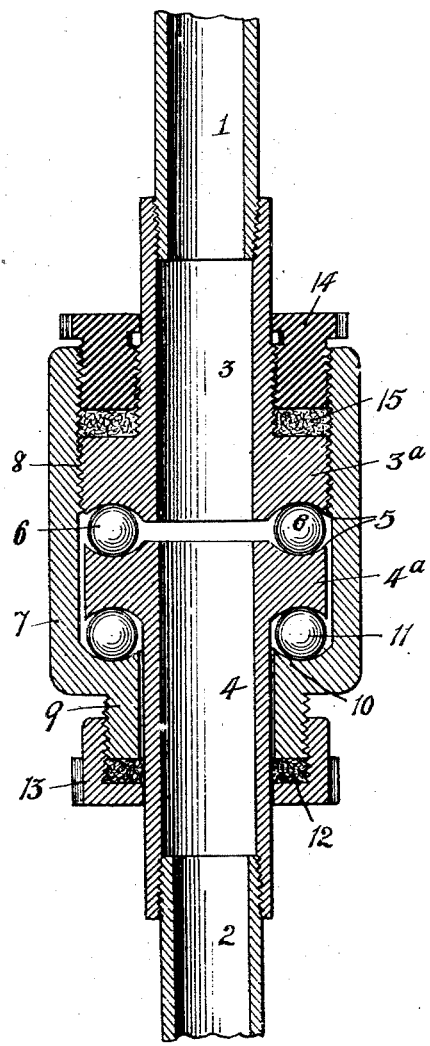
WITNESSES:
D. C. Walter
Hazel B. Hiett
INVENTOR.
August Walder,
By Owen & Owen,
His attys.

UNITED STATES PATENT OFFICE.

AUGUST WALDER, OF ARCHBOLD, OHIO.

FLUID-TIGHT ROTARY JOINT FOR PIPES.

No. 929,734.    Specification of Letters Patent.    Patented Aug. 3, 1909.

Application filed February 23, 1909. Serial No. 479,522.

*To all whom it may concern:*

Be it known that I, AUGUST WALDER, a citizen of the United States, and a resident of Archbold, in the county of Fulton and State of Ohio, have invented a certain new and useful Fluid-Tight Rotary Joint for Pipes; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a rotary joint or connection for steam or other pipes containing fluid under pressure; and has for its object the provision of a simple and efficient joint of this character which is adapted to form a fluid tight connection between the contiguous ends of two pipes and at the same time to permit such pipes to have free relative turning movements.

The operation, construction and arrangement of the parts of the invention are fully described in the following specification and a preferred embodiment thereof illustrated in the accompanying drawing, which is a central longitudinal section of two pipes connected by my joint.

Referring to the drawings, 1 and 2 designate two pipes to the contiguous spaced ends of which are threaded the outer ends of the tubular members 3 and 4, respectively. These members are each formed at their inner ends with annular shoulders or enlargements $3^a$ and $4^a$, respectively, the contiguous end faces of which are preferably provided with annular concaved seats or runways 5, 5 for the interposed balls 6. A sleeve 7 encircles the enlargements $3^a$, $4^a$ of the members 3, 4 and has one end portion thereof threaded to the enlargement $3^a$, as at 8, and its opposite end reduced, as at 9, to closely encircle the member 4 without its enlargement. Between the shoulder 10, which is formed by reducing the end of the sleeve 7, and the shoulder $4^a$ of the member 4 are disposed a set of balls 11, said shoulders preferably having their contiguous faces annularly concaved or recessed to provide suitable runways for the balls. Leakage is prevented between the member 4 and reduced end 9 of the sleeve 7 by a suitable packing ring 12, which is pressed closely to said member and to the reduced end of the sleeve by a gland 13, which is threaded to said reduced portion, as shown.

14 designates a nut which is threaded into the large end of the sleeve 7 and onto the member 3 and adapted to lock the sleeve 7 in adjusted position relative to the member 3. To overcome any leakage which might otherwise occur between the sleeve 7 and the member 3 or its shoulder a suitable packing 15 is disposed between the shoulder $3^a$ and nut 14 as shown.

It is evident with this construction that the member 4 and its attached pipe are permitted to have free turning movements relative to the member 3, the sleeve 7 and the packing parts, and that the opposing thrusts of the shoulders $3^a$ $4^a$ and 10 against the sets of balls 6 and 11 may be adjusted to a nicety to prevent longitudinal play between such parts but to permit a free turning thereof by a turning of the sleeve 7 on the shoulder $3^a$.

I wish it understood that my invention is not limited to use in any particular connection nor to any specific arrangement or construction of the parts thereof except in so far as such limitations are specified in the claims.

Having thus described my invention, what I claim as new and desire to secure by Letters Patent is:—

1. The combination of two pipes, tubular members threaded at their outer ends to the contiguous ends of said pipes and spacing such pipes apart, said members having their inner ends annularly enlarged, a sleeve encircling said members and threaded to the enlargement of one member and reduced beyond the enlargement of the other member, anti-friction means disposed between the inner faces of the enlarged ends of said members and between the reduced portion of said sleeve and the contiguous face of the enlargement of one of said members, and packing means associated with said sleeve and members to prevent leakage therebetween.

2. The combination of two pipes, members threaded to the contiguous ends of said pipes and spacing the same apart, said members having annular enlargements at their inner ends and provided with channels opening communication between said pipes, a sleeve encircling said members, said sleeve being threaded at one end to the enlarged portion of one of said members and having its opposite end reduced beyond the enlarged portion of the other member to form a shoulder in opposition to the outer face of such enlargement, balls interposed between the contiguous ends of said members and between the enlargements of one member and the shoulder formed by the reduced portion of the sleeve, means threaded into the large end of said sleeve to lock it against movement relative to the member to which it is threaded, packing interposed between said means and the enlargement of the contiguous member to prevent leakage between said member and sleeve, and packing means associated with the reduced end of said sleeve to prevent leakage between it and the contiguous member.

3. The combination of two spaced pipes, members threaded to the contiguous ends of such pipes and adapted to open communication therebetween, said members having their inner or contiguous ends enlarged to form annular shoulders, a sleeve encircling said members and threaded at one end to one of such shoulders and having its other end reduced beyond the enlargement of the other member, said sleeve having its large end extended beyond the shoulder to which it is threaded to coöperate with one of said members to form a socket, a stuffing-box gland threaded to the reduced end of said sleeve, balls interposed between the contiguous faces of said shoulders and between the reduced portion of said sleeve and the contiguous shoulder, and means threaded into the large end of such sleeve and onto the associated member to serve as a gland and also as a means for rigidly locking the sleeve and threaded member against relative movements.

In testimony whereof I have hereunto signed my name to this specification in the presence of two subscribing witnesses.

AUGUST WALDER.

Witnesses:
C. W. OWEN,
HAZEL B. HIETT.